United States Patent
Ward

[11] 3,795,107
[45] Mar. 5, 1974

[54] HYDROSTATIC TRANSMISSION AND CONTROL SYSTEM

[75] Inventor: Harold R. Ward, Marshall, Mich.

[73] Assignee: Eaton Corporation, Cleveland, Ohio

[22] Filed: Sept. 1, 1972

[21] Appl. No.: 285,729

[52] U.S. Cl.............. 60/395, 60/420, 60/428, 60/490, 60/97 E, 180/6.48
[51] Int. Cl............................. F16h 39/46
[58] Field of Search..... 60/395, 420, 421, 423, 428, 60/429, 444, 490, 97 E; 180/6.48

[56] References Cited
UNITED STATES PATENTS

| | | | |
|---|---|---|---|
| 2,360,598 | 10/1944 | Tyler | 60/395 X |
| 2,846,849 | 8/1958 | Levetus et al. | 60/97 E UX |
| 3,085,403 | 4/1963 | Hamblin et al. | 60/97 E |

FOREIGN PATENTS OR APPLICATIONS

| | | | |
|---|---|---|---|
| 1,023,033 | 3/1966 | Great Britain | 60/420 |

Primary Examiner—Edgar W. Geoghegan
Attorney, Agent, or Firm—Teagno & Toddy

[57] ABSTRACT

An improved straight tracking and steering control system is utilized to control the operation of a pair of hydrostatic transmissions having variable displacement pump and motor units which drive tracks of a vehicle. The control system includes a pair of variable displacement pumps which are associated with the hydrostatic transmission motor units. If one of the tracks of the vehicle should tend to accelerate relative to the other track of the vehicle, the hydrostatic transmission motor unit which drives the accelerating track will also increase the operating speed and output of the associated control pump. This increased fluid output is detected by a comparator which effects a variation in the displacement of the pump and/or motor units of the accelerating hydrostatic transmission to equalize the output speeds of the hydrostatic transmissions. Steering of the vehicle is effected by decreasing the displacement of one of the control pumps relative to the other control pump. For example, to turn the vehicle toward the left, the displacement of the control pump associated with the right hand track and hydrostatic transmission is decreased. The comparator will then sense the relatively high output from the left hand control pump and effect a reduction in the output speed of the left hand hydrostatic transmission.

28 Claims, 6 Drawing Figures

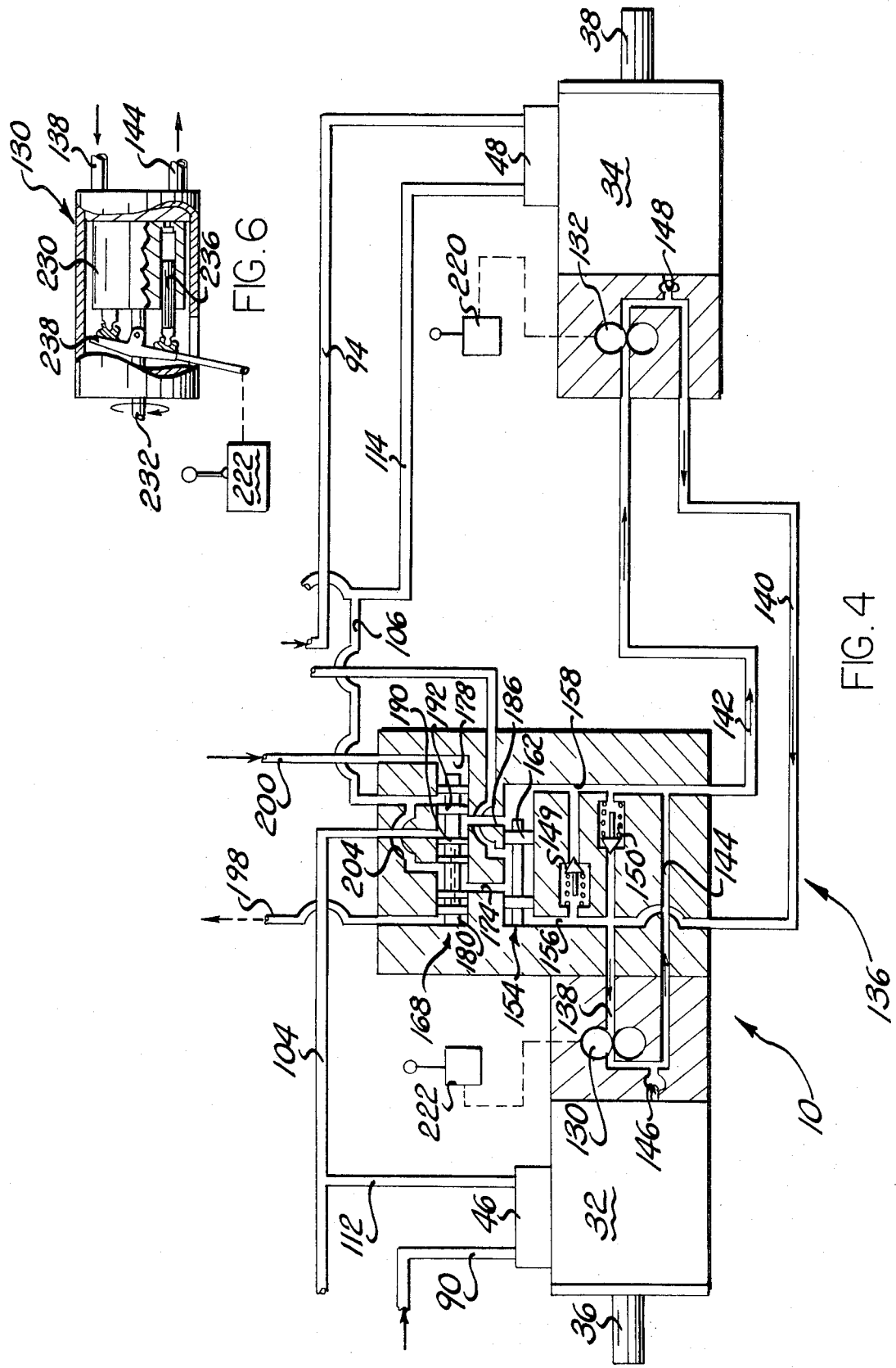

HYDROSTATIC TRANSMISSION AND CONTROL SYSTEM

BACKGROUND OF THE INVENTION

The present invention relates to a new and improved apparatus for controlling the operation of a pair of hydrostatic transmissions and more specifically to improved straight tracking and/or steering controls.

A known straight tracking control system includes a pair of fixed displacement control pumps which are driven by hydrostatic transmission motor units. A variation in the speed of one of the motor units relative to the other motor unit increased the output of the associated pump. This increased fluid output effects actuation of a valve to direct working fluid from one of the motors to the other motor in an effort to equalize the output speeds of the motors in the manner described in U.S. Pat. No. 3,355,886. It should be noted that these straight tracking controls are ineffective to vary the displacement of the hydrostatic transmission pumps and motor units and cannot be used to steer a vehicle.

Another known control system (see U.S. Pat. No. 3,217,822) is effective to vary the displacement of a motor unit of an associated hydrostatic transmission to effect straight tracking and steering control functions. This control system includes a summing differential which is driven by the output shafts of a pair of hydrostatic transmission motor units. Upon an increase in the output speed of one of the motor units relative to the other, a single fixed displacement pump is driven by the summing differential to actuate a control valve and vary the displacement of the associated hydrostatic transmission motor unit. A steering lever is moved to operate the valve and effect a change in the displacement of one of the transmission motor units to steer the vehicle.

Another control system is described in U.S. Pat. No. 3,085,403 and includes a control or comparator valve which is exposed to the fluid pressure output of a pair of control pumps which are driven by hydrostatic transmission motor units. When the output speed of one of the hydrostatic transmission units exceeds the output speed of the other hydrostatic transmission unit, the comparator valve increases the quantity of working fluid directed to one of the motor units and decreases the quantity of working fluid directed to the other motor unit. A steering control valve is selectively operable to effect operation of the comparator valve to thereby steer the associated vehicle. This known control system cannot vary the displacement of the hydrostatic transmission pump and/or motor units to effect either straight tracking or steering functions.

SUMMARY OF THE PRESENT INVENTION

The present invention provides a straight tracking and/or steering control system which is utilized in association with a pair of hydrostatic transmissions. The straight tracking and/or steering control system includes a pair of variable displacement control pumps each of which is driven by a motor unit of an associated one of the hydrostatic transmissions.

When one of the hydrostatic transmissions tends to accelerate relative to the other, the fluid output from the associated control pump increases relative to the other control pump. This increase in fluid output is detected by a comparator valve which effects operation of a pump and/or motor actuator assembly to decrease the output speed of the accelerating hydrostatic transmission. When the comparator valve is operated with the pump unit of the faster hydrostatic transmission fully swashed and the motor unit at least partially swashed, the displacement of the motor unit is increased to a maximum displacement and then the displacement of the pump unit is reduced to effect the desired reduction in the output speed of the hydrostatic transmission.

When the vehicle is to be turned, the displacmeent of one of the control pumps is varied so that the comparator valve senses an apparent overspeeding of one of the hydrostatic transmissions and reduces its output speed to turn the vehicle. For example to turn the vehicle toward the left, the displacement of the control pump associated with the right hand hydrostatic transmission is decreased. Decreasing displacement of the right hand control pump causes the comparator valve to detect that the left hand control pump has a higher fluid output than the right hand control pump. Upon detecting this condition, the comparator valve ports control fluid pressure to effect a reduction in the output speed of the left hand hydrostatic transmission.

Accordingly, it is an object of this invention to provide a new and improved straight tracking and/or steering control system for controlling the operation of a pair of hydrostatic transmissions.

Another object of this invention is to provide a new and improved straight tracking and steering control system for controlling the operation of a pair of hydrostatic transmission units and wherein the control system includes first and second control pumps each of which has a fluid output characteristic which varies as a function of variations in the output speed of an associated one of the hydrostatic transmission units, straight tracking controls for effecting a variation in the output speed of one of the hydrostatic transmission units relative to the output speed of the other hydrostatic transmission unit in response to a variation in the fluid output characteristic of one of the pumps relative to the fluid output characteristic of the other pump, and steering controls for varying the fluid output characteristic of one of the control pumps to effect a variation in the output speed of one of the hydrostatic transmission units.

Another object of this invention is to provide a new and improved straight tracking control system which includes a pair of control pumps and a pair of motors which are operable to vary the output speeds of a pair of hydrostatic transmission units in response to a variation in a fluid output characteristic of one of the control pumps relative to a fluid output characteristic of the other control pump.

Another object of this invention is to provide a new and improved apparatus for controlling the operation of a pair of hydrostatic transmissions having variable displacement pump and motor units wherein the apparatus includes a control device which detects a variation in the output speed of one of the hydrostatic transmissions relative to the output speed of the other hydrostatic transmission and thereupon effect a variation in the displacement of the pump and motor units of one of the hydrostatic transmissions to change the output speed of this hydrostatic transmission relative to the output speed of the other hydrostatic transmission.

BRIEF DESCRIPTION OF THE DRAWINGS

The foregoing and other objects and features of the present invention will become more apparent upon a consideration of the following description taken in connection with the accompanying drawings wherein:

FIG. 4 is a schematic illustration, similar to FIG. 2, depicting the control apparatus with the hydrostatic transmission motor units operating in the reverse direction and with the left hand hydrostatic transmission motor unit operating at a greater speed than the right hand hydrostatic transmission motor unit;

FIG. 6 is an enlarged schematic illustration depicting one control pump of a pair of control pumps utilized in the control system of FIGS. 2–5.

DESCRIPTION OF ONE EMBODIMENT OF THE INVENTION

GENERAL ARRANGEMENT

Figure 1:
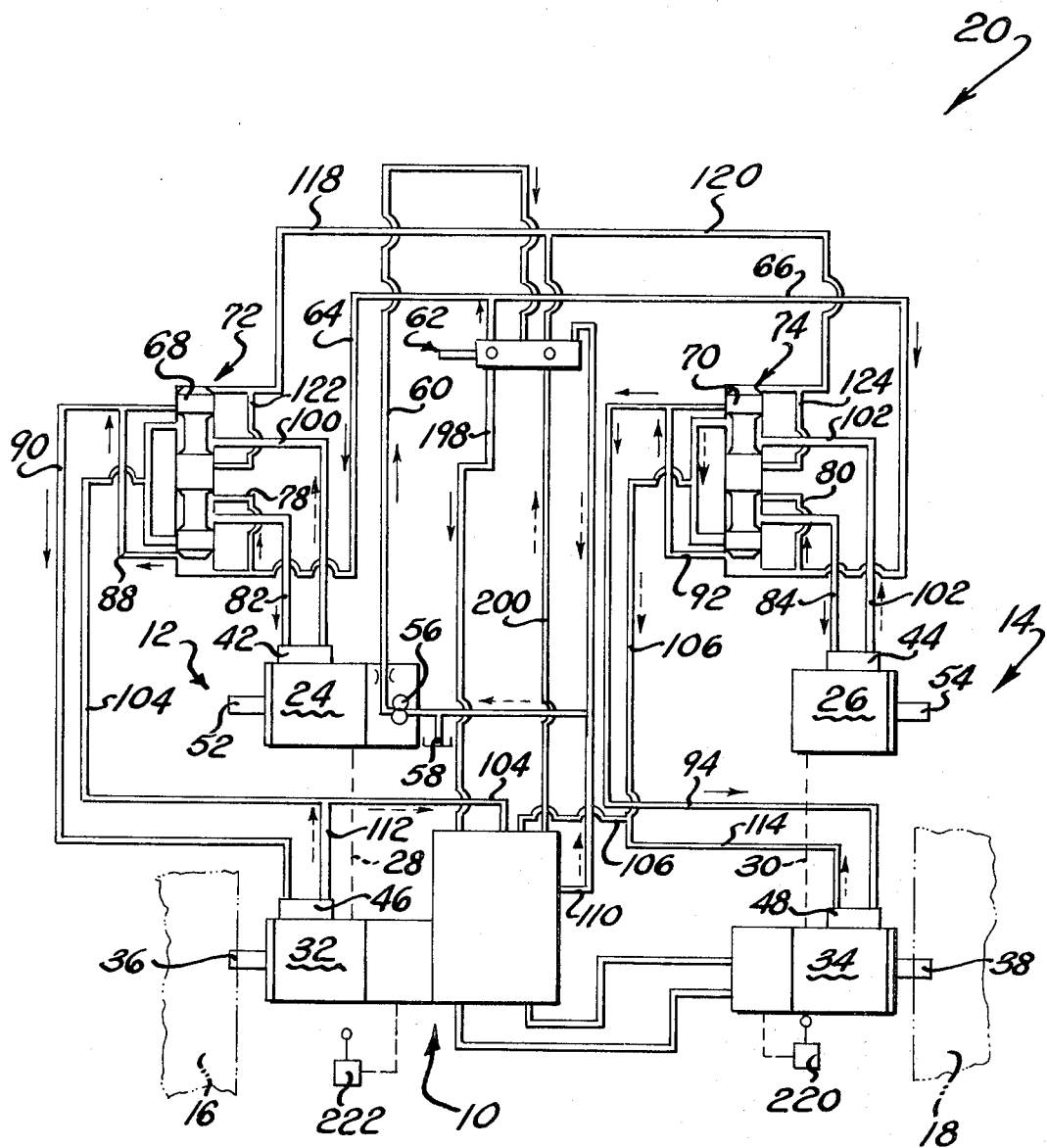
FIG. 1 is a schematic illustration depicting the relationship between pump and motor units of a pair of hydrostatic transmissions and a control system constructed in accordance with the present invention.

An improved steering and/or straight tracking control system 10 constructed in accordance with the present invention is illustrated in FIG. 1 in association with a pair of hydrostatic transmissions 12 and 14 which are utilized to drive left and right hand tracks 16 and 18 of a vehicle 20. The hydrostatic transmissions 12 and 14 are of known construction and include variable displacement pump units 24 and 26 which supply fluid under pressure through hydrostatic loops, indicated schematically 28 and 30, to variable displacement motor units 32 and 34 having rotatable output shafts 36 and 38 which are connected with the tracks 16 and 18. Double acting pump controller or actuator assemblies 42 and 44 are operable to increase the effective displacement of the pump units 24 and 26 to increase the rate at which fluid is conducted through the hydrostatic loops 28 and 30 and the speed of rotation of the motor output shafts 36 and 38. After the pump units 24 and 26 have been fully swashed, double acting motor controller or actuator assemblies 46 and 48 are operated to deswashed or decrease the displacement of the motor units 32 and 34 to effect a further increase in the speed at which the output shafts 36 and 38 are rotated.

To initate operation of the vehicle 20, an engine or other prime mover (not shown) is started to drive input shafts 52 and 54 of the pump units 24 and 26. At this time the pump units 24 and 26 have a minimum displacement and are ineffective to supply working fluid through the hydrostatic loops 28 and 30 to the motor units 32 and 34. A charge pump 56 supplies fluid under pressure from a reservoir 58 through a conduit 60 to a speed control valve 62.

Forward movement of the vehicle 20 is initiated by operating the speed control valve 62. Forward operation of the speed control valve 62 ports high pressure control fluid through conduits 64 and 66 to move slidable valve spools 68 and 70 of selector or rectifying valves 72 and 74 to the forward actuated positions of of FIG. 1. This enables control fluid to flow from conduits 64 and 66, through conduits 78 and 80, selector valves 72 and 74, and conduits 82 and 84 to the pump actuator assemblies 42 and 44. In addition, the high pressure control fluid is conducted from the selector valves 72 and 74 to the motor actuator assemblies 46 and 48 through conduits 88, 90, 92 and 94 (this fluid flow is indicated by the solid line arrows in FIG. 1). The speed control valve 62 is of the pressure regulator type disclosed in U.S. Pat. No. 3,540,220 and enables the fluid pressure conducted to the pump and motor actuator assemblies 42,44,46 and 48 to increase as a function of the extent to which the speed control valve 62 is operated.

Assuming that the speed control valve 62 is operated to a sufficient extent, the control fluid pressure conducted to the pump actuator assemblies 42 and 44 activates them to move the swashplates of the pump units 24 and 26 to their maximum displacement conditions against the influence of suitable biasing springs. Thereafter, a continued rise in the fluid pressure conducted from the speed control valve 62 results in the motor actuator assemblies 46 and 48 being operated against the influence of biasing springs which are somewhat stiffer than the biasing springs in the pump actuator assemblies 42 and 44. Operation of the motor actuator assemblies 46 and 48 reduces the effective displacement of the motor units 32 and 34.

The pump and motor actuator assemblies 42, 44, 46 and 48 are of the double acting type and fluid is exhausted from them as they are operated under the influence of control fluid from the speed control valve 62. Thus, exhaust fluid (indicated by dashed arrows in FIG. 1) is conducted from the pump actuator assemblies 42 and 44 through conduits 100 and 102 to the actuated selector valves 72 and 74 which port the exhaust fluid to conduits 104 and 106. The conduits 104 and 106 are exhausted to the control system 10 which is connected with the drain 58 by a conduit 110. The motor actuator assemblies 46 and 48 are also of the double acting type so that their operation causes fluid to be exhausted through conduits 112 and 114 to the conduits 104 and 106 leading to the control system 10.

When the vehicle 20 is to be moved in a reverse direction, the speed control valve 62 is actuated to port control fluid to the selector or rectifying valves 72 and 74 through conduits 118 and 120. This fluid causes the valve spools 68 and 70 to move downwardly (as viewd in FIG. 1) to enable a high pressure control fluid to flow from branch conduits 122 and 124 through the selector valves to the conduits 100 and 102 leading to the pump actuator assemblies 42 and 44 to thereby effect operation of the actuator assemblies in their reverse direction. In addition, this high pressure control fluid is conducted from the selector valves 72 and 74 to the motor actuator assemblies 46 and 48 by the conduits 90 and 94 to effect operation of the motor actuator assemblies 46 and 48 after the pump actuator assemblies 42 and 44 have been fully operated. During reverse operation of the pump and motor actuator assemblies 42, 44, 46 and 48, fluid is exhausted to the conduits 104 and 106 leading to the control system 10 in a manner similar to that previously explained in connection with forward operation of the actuator assemblies.

The construction of the pump and motor actuator assemblies 42, 44, 46 and 48 and their interrelationship with the selector valves 72 and 74 and speed control valve 62 is generally similar to that described in U.S. application Ser. No. 248,685, filed Apr. 28, 1972 by Edward J. Bojas and Harold R. Ward and entitled Hydrostatic Transmission Drive System. However, it should be noted that the motor actuator assemblies 46 and 48 are double acting rather than being single acting as described in the Bojas and Ward application. In addition, the selector valves 72 and 74 connect the pump and motor actuator assemblies 42, 44, 46 and 48 with the exhaust conduits 104 and 106 in a manner which is somewhat different than in the forementioned application.

STRAIGHT TRACKING

The straight tracking and/or steering control system 10 is operable to prevent undesired turning of the vehicle 20 from a straight path during either forward or reverse operation of the vehicle. In addition, the control system 10 may be selectively actuated to effect a desired turning of the vehicle toward either the right or the left. Although the control system 10 is advantageously used as a combined straight tracking and steering control system, it is contemplated that under certain circumstances the control system 10 may be used as only a straight tracking control to prevent undesired turning of the vehicle.

If the rotational speed of one of the motor output shafts 36 or 38 exceeds the speed of the other output shaft during movement of the vehicle 20 along a straight path, the control system 10 varies the displacement of the pump and/or motor unit of the faster hydrostatic transmission to equalize the rotational speeds of the output shafts 36 and 38. This enables the vehicle 20 to follow a straight path without excessive deviation due to the variations in the traction encountered by one of the tracks 16 or 18. The control system 10 accomplishes this by producing a hydraulic signal of a magnitude which is a function of the difference in the output speeds of the motor units 32 and 34. This hydraulic signal is utilized to effect a slowing of the speed of the faster motor unit 32 or 34 to match the slower motor unit.

The control system 10 includes a pair of variable displacement control pumps 130 and 132. The pump 130 is driven by the motor unit 32 at a speed which is directly proportional to the rotational speed of the output shaft 36. Similarly, the control pump 132 is driven by the motor unit 34 at a speed which is directly proportional to the rotational speed of the output shaft 38.

The two control pumps 130 and 132 are interconnected by a fluid circuit 136 so that the fluid discharged from the pump 130 flows through conduits 138 and 140 to the control pump 132 and fluid from the control pump 132 flows through conduits 142 and 144 to the control pump 130 to form a hydraulic loop between the two control pumps 130 and 132. Fluid at drain or base pressure is supplied to the hydraulic loop between the control pumps 130 and 132 through check valves 146 and 148 to maintain the fluid circuit 136 charged. A pair of relief valves 149 and 150 prevent the formation of excessive pressure in the fluid circuit 136.

When the vehicle 20 is proceeding along a straight path and the two output shafts 36 and 38 are rotating at the same speed, the pumps 130 and 132 have equal displacements. The fluid output from the pump 130 to the conduits 138 and 140 is then equal to the fluid output from the pump 132 to the conduits 142 and 144. Therefore, the rate of fluid flow and the pressure in the conduits 138 and 140 is equal to the rate of fluid flow and pressure in the conduits 142 and 144. Since the fluid pressure in the circuit 136 was initially equal to drain pressure, operation of the two equal displacement pumps 130 and 132 at the same speed results in the pressure circuit remaining at substantially drain pressure even though the pumps are effective to provide a substantial flow of fluid through the circuit. This is because the fluid intake and discharge rate of the pump 130 is equal to the fluid intake and discharge rate of the pump 132.

If one of the tracks 16 or 18 should accelerate relative to the other track, due to differences in traction or other causes, the speed of rotation of one of the output shafts 36 or 38 will increase relative to the other output shaft. For example, if the vehicle 20 is proceeding straight ahead and track 16 encounters a slippery or low traction condition, the reduced resistance to movement enables the motor unit 32 to accelerate the output shaft 36 and track 16 relative to the output shaft 38 and track 18 which are driven by the motor unit 34. Since the control pump 130 is driven by the motor unit 32 at a speed which is directly proportional to the rotational speed of the output shaft 36, the increase in the speed at which the motor unit 32 drives the output shaft 36 results in the pump 130 being driven at a higher speed than the pump 132. Of course, this will result in the pump 130 discharging fluid into the conduits 138 and 140 at a greater rate than which the pump 132 takes the fluid and discharges it into the conduits 142 and 144.

The increased flow rate from the pump 130 results in a higher pressure being present in the conduits 138 and 140 than is present in the conduits 142 and 144. The amount by which the fluid pressure in the conduits 138 and 140 exceeds the fluid pressure in the conduits 142 and 144 is a direct function of the amount by which the rotational speed of the output shaft 36 and operating speed of the pump 130 exceeds the rotational speed of the output shaft 38 operating speed of the pump 132.

The fluid pressure in the conduits 138 and 144 is monitored by a comparator valve 154 which is connected in fluid communication with the conduits 138 and 140 by conduit 156 and is connected in fluid communication with the conduits 142 and 144 by conduit 158. When the discharge rate of the pump 130 exceeds the discharge rate of the pump 132 and a relatively high pressure is present in the conduits 138 and 140, this high pressure is transmitted to the comparator valve 154 and moves a valve spool 162 to the right hand actuated position of FIG. 2. Similarly, when the discharge rate of the pump 132 exceeds the discharge rate of the pump 130, the relatively high pressure in the conduits 142 and 144 is transmitted to the comparator valve 154 by the conduit 158 to shift the valve spool 162 to the left hand actuated position shown in FIG. 3.

The comparator valve 154 ports control fluid to either the conduit 104 or the conduit 106 to effect a reduction in the output speed of one of the associated hydrostatic transmissions 12 or 14. Thus as the track 16 begins to accelerate relative to the track 18, the increased fluid flow from the pump 130 increases the pressure in the conduits 138 and 156 and shifts the valve spool 162 to the actuated position of FIG. 2. Fluid under pressure is then ported from the comparator valve 154 to a directional valve 168 which in turn ports fluid to the exhaust line 104 leading to the pump and motor actuator assemblies 42, 46 (see FIG. 1).

If the motor actuator assembly 46 had previously been operated to move the swashplate of the motor 32 from its maximum displacement position toward its minimum displacement position, the increased fluid pressure in the conduit 104 will assist the biasing spring in the double acting motor assembly 46 to effect movement of the motor swashplate back toward its maximum displacement condition. Of course, increasing the displacement of the motor 32 decreases the rotational speed of the output shaft 36.

If the output speed of hydrostatic transmission 12 was relatively low, the swashplate of the motor 32 would be in its maximum displacement condition and the motor actuator assembly would be in an unactuated condition. Under these conditions, the conduit 104 would transmit the increased fluid pressure to the pump actuator assembly 42 through the selector valve 72 and conduit 100 (see FIG. 1) to effect operation of the pump actuator assembly 42 to move the swashplate of the pump unit 24 toward its minimum displacement condition. Of course, this would effect a reduction in the fluid output from the pump unit 24 and a reduction speed of the output shaft 36.

At certain operating speeds the pump actuator assembly 42 is fully operated and the motor actuator assembly 46 is operated to a relatively small extent. Under these circumstances, the increased fluid pressure in the conduit 104 effects operation of the motor actuator assembly 46 to return the swashplate of the motor unit 32 to its maximum displacement condition. The fluid pressure then effects operation of the pump actuator assembly 42 to move the swashplate of the pump unit 24 toward its minimum displacement condition. It should be noted that the relatively stiff biasing spring in the motor actuator 46 and relatively weak biasing spring in the pump actuator assembly 42 results in a sequential operation of the pump and motor actuator assembly in a reverse order to the sequence in which they were operated as the vehicle 20 was brought up to speed. The relationship between the biasing springs in the pump and motor actuator assemblies and the construction of a suitable double acting actuator assembly is more fully described in the aforementioned Bojas and Ward application.

If when the vehicle 20 is proceeding along a straight path the track 18 encounters a slippery or low traction condition so that the right hand motor unit 34 and output shaft 38 are accelerated relative to the motor unit 32 and output shaft 36, the operating speed of the pump 132 will exceed the operating speed of the pump. This results in an increase in the fluid pressure in the conduits 142 and 144 so that the comparator valve spool 162 is moved to the left hand actuated position of FIG. 3. Fluid is then ported from the direction valve 168 to the exhaust conduit 106 leading to the pump actuator assembly 44 and motor actuator assembly 48 of the hydrostatic transmission 14.

The increased fluid pressure in the conduit 106 effects operation of the double acting pump and motor actuator assemblies 44 and 48 in the manner previously explained in connection with the hydrostatic transmission 12 to reduce the rotational speed of the output shaft 38. Thus, the increased fluid pressure in the conduit 106 is transmitted to the conduit 114 and effects operation of the motor actuator assembly 48 to deswash the motor unit 34 to its maximum displacement condition. The increased fluid pressure in conduit 106 is also transmitted through the selector valve 74 and conduit 102 to the pump actuator assembly 44 (FIG. 1). After the motor unit 34 is deswashed, the fluid pressure in the line 106 effects operation of the pump actuator assembly 44 to move the swashplate of the pump unit 26 from its maximum displacement position toward its minimum displacement position. Of course, if the output speed of the hydrostatic transmission 14 was relatively low and the motor actuator assembly 48 was initially in its unactuated condition, only the pump actuator assembly 44 would be operated in response to the increase in fluid pressure in the conduit 106. It should be noted that the biasing springs in the pump and motor actuator assemblies 44 and 48 result in the sequential operation of the actuator assemblies in the manner previously explained in connection with the hydrostatic transmission 12.

The comparator and direction valves 154 and 168 cooperate to port fluid to the proper one of the two conduits 104 or 106 depending upon which of the output shafts 36 or 38 is being rotated at the higher speed. Thus, when the rotational speed of the output shaft 36 and operating speed of the pump 130 is exceeding the rotational speed of the shaft 38 and the operating speed of the pump 32, the valve spool 162 is moved to the right hand actuated position shown in FIG. 2 to connect the conduit 156 in fluid communication with a passage 174 and chamber 178 in which a directional valve spool 180 is disposed. The control fluid from the conduit 174 flows through a central passage 182 within the valve spool 180 to the conduit 104.

Figure 3:
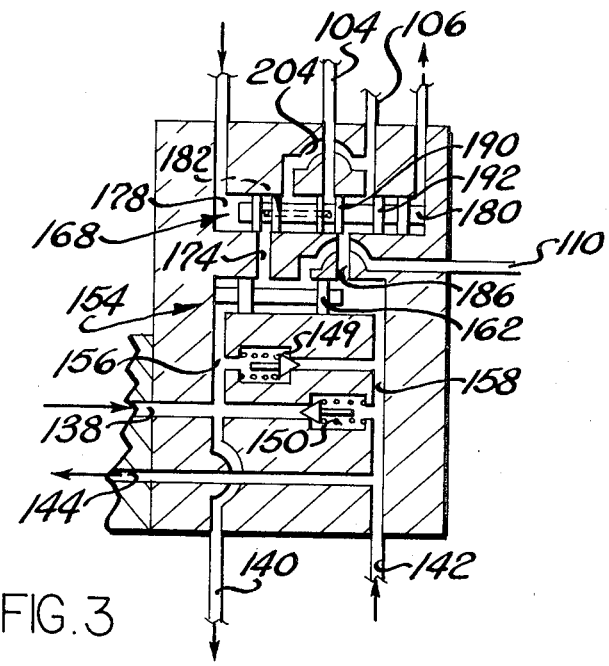
FIG. 3 is a fragmentary schematic illustration depicting a portion of the control system of FIG. 2 with the right hand hydrostatic transmission motor unit operating at a greater speed than the left hand hydrostatic transmission motor unit.

When the output speed of the shaft 38 and operational speed of the motor 132 exceeds the output speed of the shaft 36 and operational speed of the motor 130, the valve spool 162 in the comparator 154 is shifted to the left hand actuated position shown in FIG. 3 under the influence of pressure conducted through the conduit 158. Fluid pressure is then transmitted to the directional valve 168 through a passage 186. The passage 186 is connected in fluid communication with the passage 106 by the annular space between adjacent lands 190 and 192 on the directional valve spool 180.

When the vehicle 20 is being operated in the reverse direction, the direction of rotation of the output shafts 36 and 38 and operation of the pumps 130 and 132 is reversed from that of the forward direction. Thus, during forward operation of the vehicle 20 fluid from the pump 130 flows through the conduits 138 and 140 to the pump 132. However, during reverse operation of the vehicle 20 fluid from the pump 130 flows through the conduits 144 and 142 to the pump 132. During this reversal of fluid flow in the circuit 136, the directional valve 168 is shifted from the position shown in FIG. 2 to the position shown in FIG. 4 upon operation of the speed control valve 62 (see FIG. 1) from a forward actuated condition to a reverse actuated condition. To enable high pressure fluid from the comparator valve 154 to effect a reduction in the output speed of the hydrostatic transmission 12 when the operating speed of pump 130 exceeds the operating speed of pump 132 during reverse operation, the directional valve 168 is actuated to port high pressure fluid from the pump 130 and comparator valve 154 to the conduit 104 and the pump and motor actuator assemblies 42 and 46 for the hydrostatic transmission 12. When the operating speed of the pump 132 exceeds the operating speed of the pump 130, high pressure fluid is ported from the comparator valve 154 to the directional valve 168 and conduit 106 (see FIG. 5).

Figure 2:
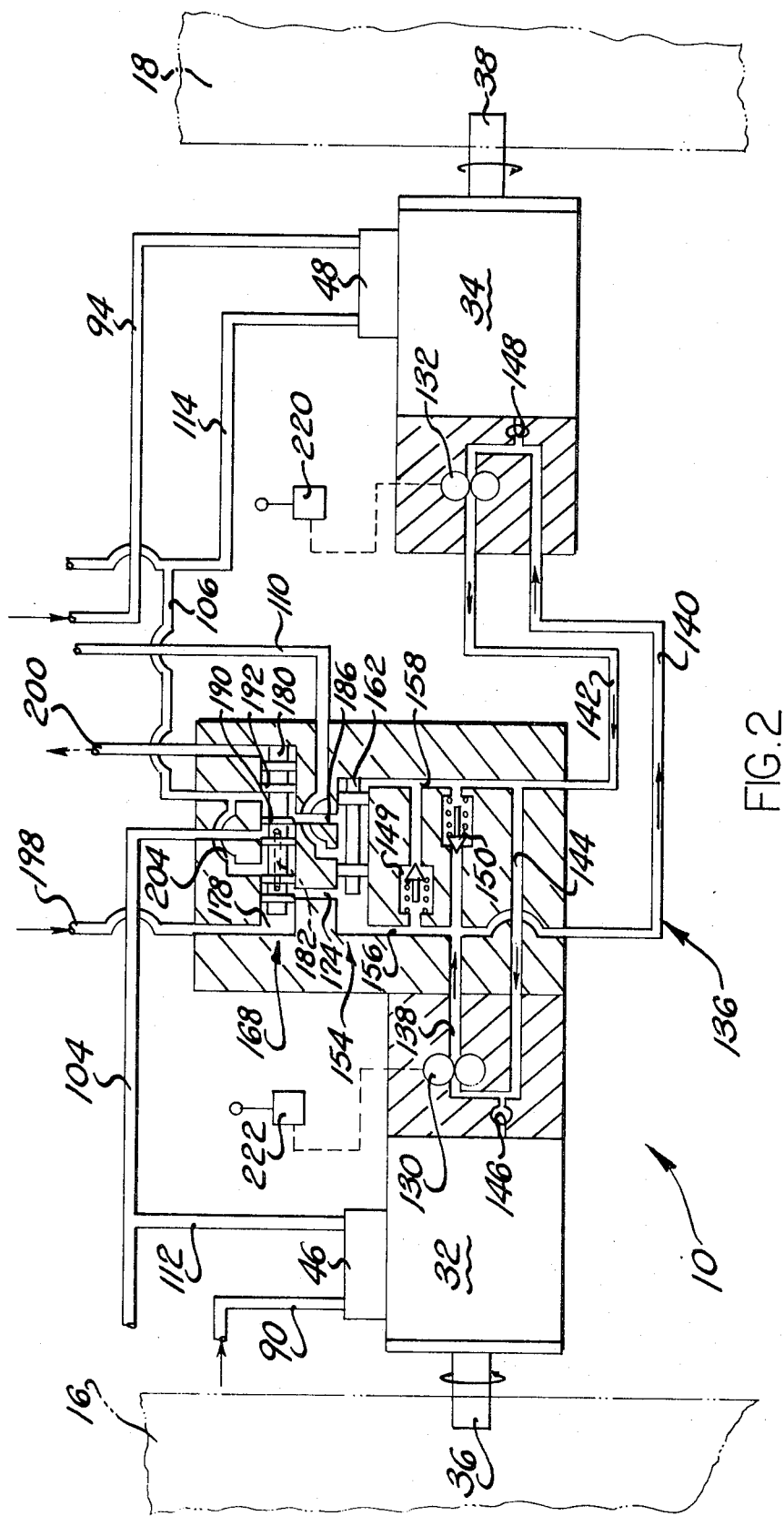
FIG. 2 is an enlarged schematic illustration depicting the relationship between the control system and the motor units of the two hydrostatic transmissions of FIG. 1, the control system being shown in a forward operated condition with a left hand hydrostatic transmission motor unit operating at a greater speed than a right hand hydrostatic transmission motor unit.

The directional valve spool 180 is shifted from the position shown in FIG. 2 to the position shown in FIG. 4 upon operation of the speed control valve 62 (see FIG. 1) from a forward actuated condition to a reverse actuated condition. Thus, when the vehicle 20 is moving in a forward direction high pressure fluid is conducted through a conduit 198 to one end of the directional valve chamber 178 which the other end of the valve chamber is connected with drain through a conduit 200 (see FIG. 2). When the speed control valve 62 is actuated to effect reverse operation of the vehicle 20, high pressure fluid is conducted through the conduit 200 to the direction valve chamber 178 and the conduit 198 is connected with drain. This reuslts in the valve spool 180 being shifted to the reverse actuated position shown in FIG. 4.

When the valve spool 180 is in the reverse actuated position and the rotational speed of the output shaft 36 and operational speed of the pump 130 exceeds the rotational speed of the output shaft 38 and operational speed of the pump 132, the relatively high fluid pressure in the conduits 144 and 158 shifts the comparator valve spool 162 to the left hand operated position of FIG. 4. High pressure fluid is then conducted from the conduit 158 through the passage 186 to the directional valve chamber 178. The high pressure fluid passes between the lands 190 and 192 and enters the passage 104 to effect actuation of the motor actuator assembly 46 and/or the pump actuator assembly 42 in the manner previously explained in connection with forward operation of the hydrostatic transmission 12.

Figure 5:
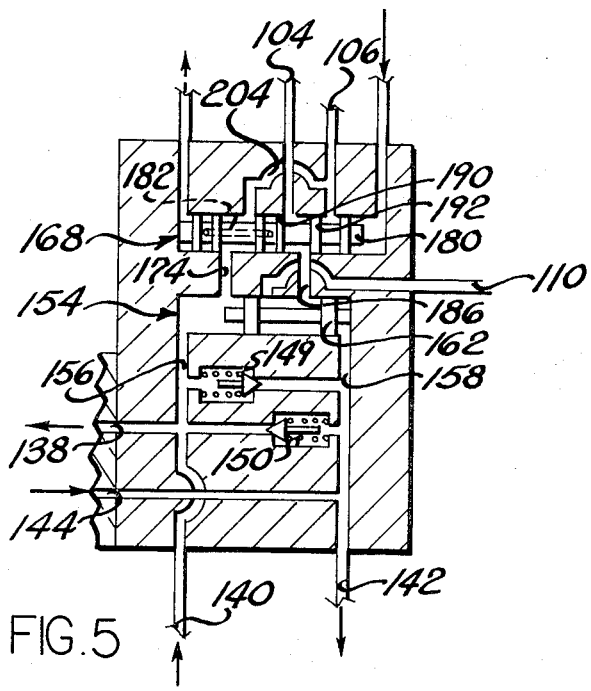
FIG. 5 (on sheet 3 of the drawings) is a schematic illustration, similar to FIG. 3, depicting the condition of the control apparatus when the hydrostatic transmission motor units are operating in the reverse direction with the right hand hydrostatic motor unit operating at a higher speed than the left hand hydrostatic motor unit.

When the rotational speed of the output shaft 38 and operational speed of the pump 132 exceeds the rotational speed of the output shaft 36 and operational speed of the pump 130 as the vehicle is moving in the reverse direction, the relatively high fluid pressure in the conduit 10 is transmitted to the comparator valve 154 to move the valve spool 162 to the right hand actuated position of FIG. 5. The relatively high fluid pressure in the conduit 156 is transmitted through the passage 174 to the directional valve chamber 178 (FIG. 5) and to a branch passage 204 leading to the exhaust conduit 106. The increase in fluid pressure in the exhaust conduit 106 effects actuation of the motor actuator assembly 48 and/or pump actuator assembly 44 to reduce the rotational speed of the output shaft 38 in the manner previously explained in connection with the forward operation of the hydrostatic transmission 14. It should be noted that during both forward and reverse operation of the hydrostatic transmissions 12 and 14 the passages 104 and 106 furnction as exhaust passages for the double acting pump and motor actuator assemblies 42, 44, 46 and 48. This is because the valve spools 68 and 70 and the selector valves 72 and 74 are shifted to maintain the conduits 104 and 106 as exhaust conduits during forward and reverse operation of the vehicle 20.

STEERING CONTROL

The pumps 130 and 132 are of the variable displacement type to enable the control system 10 to be utilized for both straight tracking and steering control functions. Steering of the vehicle 20 is accomplished by changing the displacement of one of the two control pumps 130 and 132 so that the comparator valve 154 senses an apparent difference in the rotational speeds of the output shafts 36 and 38 even through the shafts are being rotated at the same speed. This results in a correction signal being applied until one of the hydrostatic transmissions 12 or 14 change the rotational speed of one of the shafts 36 or 38 to cause a turning of the vehicle.

When the vehicle is to be turned, the displacement of one of the control pumps 130 or 132 is reduced. Since the pumps 130 and 132 are operating at the same speed, the reduction in displacement of one of the pumps prevents it from pumping the volume of fluid discharged from the other pump. This causes a pressure rise to occur in one of the conduits 140 or 142 of the fluid circuit 136. The pressure rise enables the comparator valve 154 to port fluid to reduce the rotational speed of the output shaft 36 or 38 associated with the pump 130 or 132 having the larger displacement.

If the vehicle 20 is to be turned toward the left while moving forward, a suitable control 220 is actuated to reduce the displacement of the right hand control pump 132 (see FIG. 2). Since the pumps 130 and 132 are both of the positive displacement type and are both being driven at the same speed, fluid is discharged from the pump 130 at a greater rate than which fluid is accepted by and discharged from the pump 132 which now has a reduced displacement. This results in an increase in the fluid pressure in the conduits 138 and 140. This increased fluid pressure in the conduit 140 causes the valve spool 162 of the comparator valve 154 to be moved to the right hand actuated position (FIG. 2). Fluid pressure is then transmitted by the directional valve 168 to the exhaust conduit 104 to reduce the rotational speed of the output shaft 36 in the manner previously explained in connection with straight tracking functions. Of course, the decrease in rotation speed of the output shaft 36 results in a decrease in the speed at which the left hand track 16 is driven so that the vehicle 20 turns toward the left.

If the vehicle 20 is to be turned toward the right, the displacement of the left hand control pump 130 is reduced by actuating a suitable control 222. The control pump 132 will now have a larger displacement than the control pump 130. Therefore, the fluid pressure in the conduit 142 will tend to build up and move the valve spool 162 of the comparator valve 154 to the left hand actuated position of FIG. 3. This results in the pressure being transmitted through the directional valve 168 to the exhaust conduit 106 to operate the pump actuator assembly 44 and/or the motor actuator assembly 48 to reduce the output speed of the hydrostatic transmission 14 in the manner previously explained.

During reverse operation of the vehicle 20, the steering controls 220 and 222 are actuated to effect turning of the vehicle in the same manner as during forward operation of the vehicle. For example if the vehicle is to be turned toward the left while moving backward, the displacement of the control pump 132 is reduced. The resulting pressure buildup in the line 142 is transmitted through the comparator and directional valves 154 and 168 to the conduit 104 to effect a reduction in the rotational speed of the output shaft 36. Similarly, the displacement of the control pump 130 is reduced to effect a turning of the vehicle 20 toward the right as the vehicle is moving in the reverse direction.

Upon actuation of one of the steering controls 220 or 222, the output speed of one of the tracks 16 or 18 is decreased by a percentage which is proportional to the percentage by which the displacement of one of the pumps 130 or 132 is decreased. Thus, if the displacement of the control pump 130 is decreased by 50 percent due to actuation of the controls 222, a 50 percent reduction will be effected in the rotational speed of the output shaft 38 and speed at which the track 18 is driven by the hydrostatic transmission 14. A spin turn is effected by going past neutral to full swash in the opposite direction.

The control pumps 130 and 132 are the positive acting variable displacement type. Although any type of control pump having these characteristics could be utilized, in one specific embodiment of the invention the control pumps 130 and 132 were of the axial piston (FIG. 6). The control pump 130 includes a barrel or body 230 which is rotated by an input shaft 232. The shaft 232 is connected with and driven by motor unit 32 of the hydrostatic transmission 12. Upon rotation of the input shaft 232 and barrel 230, pistons 236 are reciprocated axially relative to the barrel by a movable swashplate 238.

During forward rotation of the shaft 232, reciprocations of the pistons 236 cause fluid to be drawn into working chambers in the barrel 230 through the conduit 138 and to be discharged from the working chambers through a conduit 144. Of course during reverse rotation of the input shaft 232, the fluid is drawn in through the conduit 144 and discharged through the conduit 138.

To effect a reduction in the displacement of the control pump 130, the controls 222 are operated to effect movement of the swashplate in a counterclockwise direction from the position shown in FIG. 6. Counterclockwise movement of the swashplate toward a position in which it extends perpendicular to the axis of rotation of the shaft 232 reduces the effective displacement of the control pump 130 in a known manner. Reducing the displacement of the pump 130 decreases the rate at which fluid can be accepted by the pump through the conduit 138 and the rate at which the fluid is discharged from the pump to the conduit 144. It should be noted that the pumps 130 and 132 are the positive action type so the volume of the fluid flow is a function of operation speed and displacement.

In view of the foregoing description it can be seen that the straight tracking and/or steering control system 10 includes a pair of control pumps 130 and 132 which provide hydraulic signals to control straight tracking of the vehicle 20. In addition, the displacement of the pumps 130 and 132 can be varied to effect steering of the vehicle. During both straight tracking and steering control operations, the pump and/or motor actuator assemblies for the pump and motor units of one of the hydrostatic transmissions are operated to vary the rotational speed of the output shaft of that hydrostatic transmission. While it is believed to be advantageous to use the control system 10 as a combined steering and straight tracking control system, it would be understood that the control system could be utilized to perform only straight tracking functions if desired.

Having described a specific preferred embodiment of the invention the following is claimed:

1. An apparatus comprising first and second hydrostatic transmission units, first motor means for varying the output speed of said first hydrostatic transmission unit, second motor means for varying the output speed of said second hydrostatic transmission unit, first and second pumps each of which is driven by an associated one of said hydrostatic transmission units and each having a fluid output characteristic which varies as a function of variations in the output speed of the associated one of said hydrostatic transmission units, comparator means for comparing the fluid output characteristics of said first and second pumps and for effecting operation of at least one of said motor means in response to a change in the fluid output characteristics of one of said pumps relative to the fluid output characteristic of the other of said pumps to thereby effect a change in the output speed of at least one of said hydrostatic transmission units, said comparator means including valve means for porting fluid from said pumps to said motor means to effect operation of said motor means.

2. An apparatus comprising first and second hydrostatic transmission units, first motor means for varying the output speed of said first hydrostatic transmission unit, second motor means for varying the output speed of said second hydrostatic transmission unit, first and second pumps each of which is driven by an associated one of said hydrostatic transmission units and each having a fluid output characteristic which varies as a function of variations in the output speed of the associated one of said hydrostatic transmission units, comparator means for comparing the fluid output characteristics of said first and second pumps and for effecting operation of at least one of said motor means in response to a change in the fluid output characteristics of one of said pumps relative to the fluid output characteristic of the other of said pumps to thereby effect a change in the output speed of at least one of said hydrostatic units, said comparator means including valve means operable between a first condition porting fluid from said first pump to said first motor means and a second condition porting fluid from said second pump to said second motor means and means for effecting operation of said valve means to said first condition in response to a change in the fluid output characteristic of said first pump relative to the fluid output characteristic of said second pump and for effecting operation of said valve means to said second condition in response to a change in the fluid output characteristic of said second pump relative to the fluid output characteristic of said first pump.

3. An apparatus as set forth in claim 1 further including speed control means for effecting simultaneous operation of said first and second motor means to vary the output speeds of said first and second pumps.

4. An apparatus as set forth in claim 1 further including first conduit means for conducting fluid from said first pump to said second pump and second conduit means for conducting fluid flow from said second pump to said first pump, said valve means being operable from a first condition to a second condition in response to a variation in the rate at which fluid is discharged from one of said pump means into one of said conduit means relative to the rate at which fluid is discharged from the other of said pump means into the other of said conduit means.

5. An apparatus as set forth in claim 2 further including speed control valve means for porting fluid under pressure to said first and second motor means to simultaneously vary the output speeds of said first and second hydrostatic transmission units.

6. An apparatus as set forth in claim 5 further including steering control means for selectively varying the fluid output characteristic of one of said pumps relative to the fluid output characteristic of the other of said pumps to effect a change in the output speed of one of said hydrostatic transmission units relative to the output speed of the other hydrostatic transmission unit.

7. An apparatus comprising a first hydrostatic transmission having a pump unit connected in fluid communication with a motor unit which is operable to rotate a first output member, first actuator means for varying the displacement of one of said units of said first hydrostatic transmission to vary the speed of rotation of said first output member, a second hydrostatic transmission having a pump unit connected in fluid communication with a motor unit which is operable to rotate a second output member, second actuator means for varying the displacement of one of said units of said second hydrostatic transmission to vary the speed of rotation of said second output member, a first variable displacement pump driven by the motor unit of said first hydrostatic transmission at a speed which varies with variations in the speed of rotation of said first output member, a second variable displacement pump driven by the motor unit of said second hydrostatic transmission at a speed which varies with variations in the speed of rotation of said second output member, conduit means for conducting at least a portion of a flow of fluid discharged from said first variable displacement pump to said second variable displacement pump and for conducting at least a portion of a flow of fluid discharged from said second variable displacement pump to said first variable displacement pump, first control means for detecting a variation in the rate at which fluid is discharged from one of said variable displacement pumps relative to the rate at which fluid is discharged from the other of said variable displacement pumps, for effecting activation of said first actuator means to vary the displacement of one of said units of said first hydrostatic transmission in response to detection of a change in the rate at which fluid is discharged from said first variable displacement pump relative to the rate at which fluid is discharged from said second variable displacement pump, and for effecting activation of said second actuator means to vary the displacement of one of said units of said second hydrostatic transmission in response to detection of a change in the rate at which fluid is discharged from said second variable displacement pump relative to the rate at which fluid is discharged from said first variable displacement pump, and second control means for varying the displacement of said first variable displacement pump relative to the displacement of said second variable displacement pump and for varying the displacement of said second variable displacement pump relative to the displacement of said first variable displacement pump to change the rate at which fluid is discharged from at least one of said variable displacement pumps.

8. An apparatus as set forth in claim 7 further including speed control means for effecting simultaneous activation of said first and second actuator means to vary the displacement of units of said first and second hydrostatic transmissions by substantially equal amounts.

9. An apparatus as set forth in claim 7 wherein said first and second actuator means are operable to vary the displacement of said motor units of said first and second hydrostatic transmissions, said apparatus further including third actuator means for varying the displacement of said pump unit of said first hydrostatic transmission and fourth actuator means for varying the displacement of said pump unit of said second hydrostatic transmission, said first control means being operable to effect activation of third and fourth actuator means to enable said first control means to effect a variation in the displacements of the pump and motor units of at least one of said hydrostatic transmissions in response to detection of a variation in the rate at which fluid is discharged from one of said variable displacement pumps relative to the rate at which fluid is discharged from the other of said variable displacement pumps.

10. An apparatus as set forth in claim 9 wherein said first and second actuator means are effective to initiate a change in the displacement of said motor units of said first and second hydrostatic transmissions prior to initiation of a change in the displacement of said pump units by said third and fourth actuator means upon detection by said first control means of a variation in the rate at which fluid is discharged from one of said variable displacement pumps with said first, second, third and fourth actuator means in an operated condition.

11. An apparatus comprising a first hydrostatic transmission having a variable displacement pump unit connected in fluid communication with a variable displacement motor unit which is operable to rotate a first output member, first actuator means for varying the displacement of said pump unit of said first hydrostatic transmission, second actuator means for varying the displacement of said motor unit of said first hydrostatic transmission, a second hydrostatic transmission having a pump unit connected in fluid communication with a motor unit which is operable to rotate a second output member; and control means for detecting a variation in the speed at which one of said output members is rotated relative to the other of said output members during operation of said first and second hydrostatic transmissions, and for effecting operation of said first and second actuator means to vary the displacement of said pump and motor units of said first hydrostatic transmission in response to detection of a variation in the speed at which one of said output members is rotated relative to the other of said output members when said first and second actuator means are in an operated condition.

12. An apparatus as set forth in claim 11 wherein said control means is operable to effect initial operation of said second actuator means to vary the displacement of said motor unit of said first hydrostatic transmission prior to effecting initial operation of said first actuator means to vary the displacement of said pump unit of said first hydrostatic transmission.

13. An apparatus as set forth in claim 11 wherein said control means includes first and second pumps each of which is driven by an associated one of said motor units and each having a fluid output characteristic which varies as a function of variations in the speed of rotation of the output member of the associated one of said motor units, and means for detecting a change in the fluid output characteristic of one of said pumps relative to the other to thereby detect a variation in the speed at which one of said output members is rotated relative to the other of said output members.

14. An apparatus as set forth in claim 13 further including means for varying the displacement of one of said pumps to change the fluid output characteristic of said one of said pumps.

15. An apparatus as set forth in claim 11 further including third actuator means for varying the displacement of said pump unit of said second hydrostatic transmission, and fourth actuator means for varying the displacement of said motor unit of said second hydrostatic transmission, said control means being operable to effect operation of said third and fourth actuator means to vary the displacement of said pump and motor units of said second hydrostatic transmission in response to detection of a variation in the speed at which one of said output members is rotated relative to the other of said output members when said third and fourth actuator means are in an operated condition.

16. An apparatus as set forth in claim 15 further including speed control valve means for effecting operation of said first, second, third and fourth actuator means to simultaneously vary the speeds at which said first and second output members are rotated by said motor units.

17. An apparatus as set forth in claim 11 wherein said control means includes first and second pumps each of which is driven by an associated one of said motor units and each having a fluid output characteristic which varies as a function of variations in the speed at which the associated one of said motor units rotates the associated one of said output members, first means for effecting a variation in the output speed of said first hydrostatic transmission relative to the output speed of said second hydrostatic transmission in response to a variation in the fluid output characteristic of one of said pumps relative to the fluid output characteristic of the other of said pumps, and second means for selectively varying the fluid output characteristic of at least one of said pumps to initiate operation of said first means to vary the output speed of said first hydrostatic transmission.

18. An apparatus as set forth in claim 17 wherein said second means includes means for varying the displacement of one of said pumps to change the fluid output characteristic of said one of said pumps.

19. An apparatus as set forth in claim 17 wherein said first and second pumps are of the variable displacement type and said second means includes means for varying the displacement of said first and second pumps.

20. An apparatus as set forth in claim 17 wherein said first actuator means includes fluid motor means connected with said pump unit of said first hydrostatic transmission for varying the displacement of said pump unit of said first hydrostatic transmission, said first means including comparator means for comparing the fluid output characteristics of said first and second pumps and for effecting operation of said fluid motor means in response to a variation in the fluid output characteristic of one of said pumps relative to the other of said pumps.

21. An apparatus as set forth in claim 17 further including first conduit means for conducting fluid from said first pump to said second pump and second conduit means for conducting fluid from said second pump to said first pump, said first means being operable to effect operation of at least one of said actuator means to change the displacement of at least one of said units of said first hydrostatic transmission in response to a change in the rate at which fluid from said first pump enters said first conduit means relative to the rate at which fluid from said second pump enters said second fluid conduit means.

22. An apparatus as set forth in claim 21 wherein said second means includes means for varying the displacement of said first pump to vary the rate at which fluid enters said first conduit means from said first pump.

23. An apparatus as set forth in claim 17 wherein said first actuator means includes first fluid motor means for varying the displacement of said pump unit of said first hydrostatic transmission, said second actuator means includes second fluid motor means for varying the displacement of said motor unit of said first hydrostatic transmission, and means for effecting operation of at least one of said fluid motor means in response to a change in the fluid output characteristic of one of said first and second pumps.

24. An apparatus comprising a first hydrostatic transmission, said first hydrostatic transmission including a first pump unit, a first motor unit which is operable to rotate a first output member, and first fluid conduit means for conducting working fluid under pressure from said first pump unit to said first motor unit and for conducting fluid from said first motor unit to said first pump unit, first fluid pressure responsive actuator means for varying the displacement of at least one of said units of said first hydrostatic transmission in response to a change in control fluid pressure to vary the speed of rotation of said first output member, a second hydrostatic transmission, said second hydrostatic transmission including a second pump unit, a second motor unit which is operable to rotate a second output member, and second fluid conduit means for conducting working fluid under pressure from said second pump unit to said second motor unit and for conducting fluid from said second motor unit to said second pump unit, second fluid pressure responsive actuator means for varying the displacement of at least one of said units of said second hydrostatic transmission in response to a change in control fluid pressure to vary the speed of rotation of said second output member, pressure controller means for varying the control fluid pressure conducted to said first and second actuator means independently of said first and second fluid conduit means and as a function of the extent of operation of said pressure controller means from an initial condition, a first pump driven by said first motor unit at a speed which varies with variations in the speed of rotation of said first output member, a second pump driven by said second motor unit of said second hydrostatic transmission at a speed which varies with variations in the speed of rotation of said second output member, and first control means for detecting a variation in the rate at which fluid is discharged from one of said pumps relative to the rate at which fluid is discharged from the other of said pumps, for porting fluid pressure to said first actuator means to effect operation of said first actuator means to vary the displacement of at least one of said units of said first hydrostatic transmission in response to detection of a change in the rate at which fluid is discharged from said first pump relative to the rate at which fluid is discharged from said second pump while maintaining the extent of operation of said pressure controller means from the initial condition substantially constant, and for porting fluid pressure to said second actuator means to effect operation of said second actuator means to vary the displacement of at least one of said units of said second hydrostatic transmission in response to detection of a change in the rate at which fluid is discharged from said second pump relative to the rate at which fluid is discharged from said first pump while maintaining the extent of operation of said pressure controller means from the initial condition substantially constant.

25. An apparatus as set forth in claim 24 wherein said first actuator means includes first pressure responsive motor means for varying the displacement of said first pump unit and said second actuator means includes second pressure responsive motor means for varying the displacement of said second pump unit, said apparatus further including third fluid conduit means for conducting fluid pressure from said first control means to said first pressure responsive motor means upon detection of a change in the rate at which fluid is discharged from said first pump relative to the rate at which fluid is discharged from said second pump, and fourth fluid conduit means for conducting fluid pressure from said first control means to said second pressure responsive motor means upon detection of a change in the rate at which fluid is discharged from said second pump relative to the rate at which fluid is discharged from said first pump.

26. An apparatus as set forth in claim 25 wherein said first actuator means further includes third pressure responsive motor means for varying the displacement of said first motor unit and said second actuator means further includes fourth pressure responsive motor means for varying the displacement of said second motor unit, said third fluid conduit means including means for conducting fluid pressure to said third pressure responsive motor means upon detection of a change in the rate at which fluid is discharged from said first pump relative to the rate at which fluid is discharged from said second pump, and said fourth fluid conduit means including means for conducting fluid pressure to said fourth pressure responsive motor means upon detection of a change in the rate at which fluid is discharged from said second pump relative to the rate at which fluid is discharged from said first pump.

27. An apparatus as set forth in claim 26 further including fifth fluid conduit means for conducting at least a portion of a flow of fluid discharged from said first pump to said second pump and for conducting at least a portion of a flow of fluid discharged from said second pump to said first pump.

28. An apparatus as set forth in claim 24 further including second control means for varying the displacement of at least one of said pumps relative to the displacement of the other of said pumps to change the rate at which fluid is discharged from the one pump relative to the rate at which fluid is discharged from the other pump.

* * * * *

UNITED STATES PATENT OFFICE
CERTIFICATE OF CORRECTION

Patent No. 3,795,107      Dated March 5, 1974

Inventor(s) Harold R. Ward

It is certified that error appears in the above-identified patent and that said Letters Patent are hereby corrected as shown below:

Column 9, line 29, "which" should read -- while --; line 58, "10" should read -- 140 --.

Signed and sealed this 9th day of July 1974.

(SEAL)
Attest:

McCOY M. GIBSON, JR.
Attesting Officer

C. MARSHALL DANN
Commissioner of Patents